UNITED STATES PATENT OFFICE.

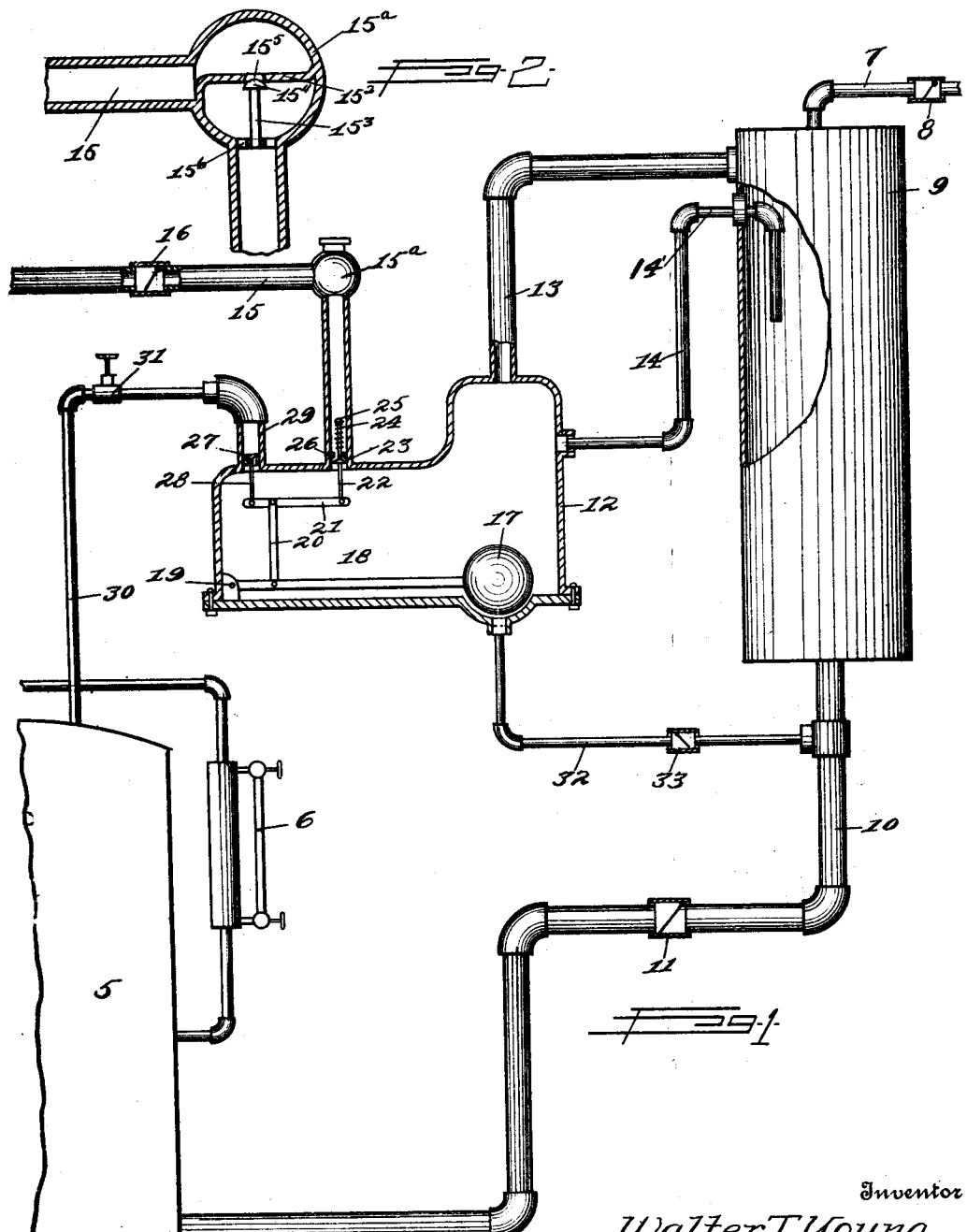

WALTER T. YOUNG, OF SHERIDAN, WYOMING.

AIR-DISCHARGING AND CONDENSATION-RETURNING APPARATUS.

1,066,776.   Specification of Letters Patent.   Patented July 8, 1913.

Application filed March 16, 1912. Serial No. 684,328.

*To all whom it may concern:*

Be it known that I, WALTER T. YOUNG, a citizen of the United States of America, residing at Sheridan, in the county of Sheridan and State of Wyoming, have invented certain new and useful Improvements in Air-Discharging and Condensation-Returning Apparatus, of which the following is a specification.

This invention relates to an air discharging and condensation returning apparatus for use in steam heating systems, the object of the invention being to provide an improved means for collecting the water of condensation, automatically returning said water of condensation to the boiler, for creating a vacuum to draw the water of condensation and air from the pipes of the heating system, and for discharging the air.

Further objects and advantages of the invention will be set forth in the detailed description which now follows.

In the accompanying drawing Figure 1 is a diagrammatic view illustrating the invention, and Fig. 2 is a sectional view of a valve hereinafter described.

Referring to the drawing the numeral 5 designates the boiler of a heating system, the approximate height of the water therein being indicated at 6.

7 designates the return pipe from a steam heating system, having a check valve 8 located therein which opens toward a tank 9 into which the return pipe discharges. A pipe 10 leads from the bottom of the tank 9 to the boiler 5 and has a check valve 11 therein opening toward the boiler. A trap 12 is connected by means of an air pipe 13 with the tank 9. A siphon 14 leads from tank 9 and discharges into trap 12. An air pipe 15 leads from the top of trap 12 and has an outwardly opening check valve 16 located therein. A float 17 is carried by a lever 18 that is pivoted at 19 within the trap 12. A link 20 connects lever 18 with a bar 21. The bar 21 is connected with the stem 22 of an air valve 23. A spring 24 bears between a head 25 of valve stem 22 and a valve seat ring 26 and normally tends to close valve 23. The steam valve 27 is mounted upon a stem 28 which is likewise connected to the bar 21. Upward movement of the float seats the air valve and unseats the steam valve. A steam valve casing 29 is in communication with the boiler through a pipe 30, in which is provided a controlling valve 31. The trap 12 is in communication with the pipe 10 through the medium of a comparatively small drain pipe 32, this drain pipe having a check valve 33 located therein which opens from the trap and toward the pipe 10.

The operation of the device is as follows: The water of condensation from the return pipe 7 collects in the tank 9. This water cannot back up into the trap 12 because of the check valve 33, and it will not enter the boiler because the boiler pressure holds check valve 11 closed. When the water in the tank rises above the horizontal portion 14' of siphon 14, this siphon starts to discharge into the trap 12. When enough water has been discharged into the trap 12 to raise float 17, the steam valve 27 is opened and the air valve 23 is closed. Steam thereupon enters the trap through pipe 30 and equalizes the pressure within the boiler, trap 12 and tank 9, whereupon, the water contained within tank 9 and trap 12 will flow into the boiler through pipe 10, past check 11, and through pipe 32 past check 33. Pipe 32 is made small in comparison with pipe 10 to prevent the trap from being drained so rapidly that the float will descend and close the steam valve before the tank 9 is emptied. When the tank 9 and the trap 12 are substantially empty, the float descends and closes the steam valve and opens the air valve. This leaves a certain amount of steam in the trap 12 but not under pressure. As this steam condenses, a vacuum is created in the trap which draws the air and water of condensation through the return pipe. The creation of this vacuum is rendered possible despite the opening of the air valve 23, by reason of the fact that the check valve 16 opens only outwardly and prevents inward flow of air to the trap 12 during such condensation of the steam and creation of the vacuum.

To prevent steam passing out through check valve 16 under normal conditions, an expansion valve 15ª is located in pipe 15, the heat of the steam causing this valve to close. Valves of this nature are well known in the art, and it is thought no further description is required. The valve 15ª closes only when steam is present in trap 12 and the parts are in the position shown in the drawing. After the valve 27 closes and valve 23 opens, sufficient steam is left in the trap and in the piping, and in tank 9 to cause the escape of steam past check valve 16 if the valve 15ª were not provided. As soon as valve 23 opens and valve 27 closes the contact of the steam with valve 15ª causes said valve to close and thereby prevents the escape of steam past check valve 16 between the time of closing of valve 27 and the condensation of the steam within the trap. After the steam condenses and only air is present in trap 12, the cooling of the valve 15ª causes it to open to permit the escape of the air, as hereinbefore set forth, the outward flow of the air at this time being caused by the rise of the water in trap 12. The valve 15ª is shown in section in Fig. 2, and by referring to this figure it will be seen that the valve comprises a casing having a valve seat 15². An expansive stem 15³ carries a valve 15⁴ which when the stem expands under the influence of the heat of the steam, closes the port 15⁵. The stem 15³ is supported by a spider 15⁶.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview, such changes as may be made within the scope of the appended claims.

Having described my invention what I claim is.—

1. In a device of the character described, the combination with a steam heating boiler, a return pipe from the steam heating system, a tank into which the return pipe discharges, a pipe leading from the lower portion of the tank to the boiler and having a check valve located therein opening toward the boiler, a float controlled trap body, a siphon leading from the tank and discharging into the trap body, means for conducting steam to the trap body from the boiler, an air pipe leading to the atmosphere from the trap body and having an outwardly opening check valve therein and an air valve and a steam valve actuated by movement of the float of the trap, upward movement of the float serving to open the steam valve and close the air valve.

2. In a device of the character described, the combination with a steam heating boiler, a return pipe from the steam heating system, a tank into which the return pipe discharges, a pipe leading from the lower portion of the tank to the boiler and having a check valve located therein opening toward the boiler, a float controlled trap body, a siphon leading from the tank and discharging into the trap body, means for conducting steam to the trap body from the boiler, an air pipe leading to the atmosphere from the trap body and having an outwardly opening check valve therein, an air valve and a steam valve actuated by movement of the float of the trap, upward movement of the float serving to open the steam valve and close the air valve, and an air pipe leading from the upper portion of the tank to the upper portion of the trap body.

3. In a device of the character described, the combination with a steam heating boiler, a return pipe from the steam heating system, a tank into which the return pipe discharges, a pipe leading from the lower portion of the tank to the boiler and having a check valve located therein opening toward the boiler, a float controlled trap body, a siphon leading from the tank and discharging into the trap body, means for conducting steam to the trap body from the boiler, an air pipe leading to the atmosphere from the trap body and having an outwardly opening check valve therein, an air valve and a steam valve actuated by movement of the float of the trap, upward movement of the float serving to open the steam valve and close the air valve, and a drain pipe leading from the lower portion of the trap body to the pipe that leads from the lower portion of the tank to the boiler, said drain pipe having a check valve therein which opens toward the pipe to which it leads.

4. In a device of the character described, the combination with a steam heating boiler, a return pipe from the steam heating system, a tank into which the return pipe discharges, a pipe leading from the lower portion of the tank to the boiler and having a check valve located therein opening toward the boiler, a float controlled trap body, a siphon leading from the tank and discharging into the trap body, means for conducting steam to the trap body from the boiler, an air pipe leading to the atmosphere from the trap body and having an outwardly opening check valve therein, an air valve and a steam valve actuated by movement of the float of the trap, upward movement of the float serving to open the steam valve and close the air valve, an air pipe leading from the upper portion of the tank to the trap body, a drain pipe leading from the lower portion of the trap body to the pipe that leads from the tank to the boiler, and a check valve in said drain pipe which opens toward the pipe to which it leads, said drain pipe being considerably smaller than the pipe into which it discharges.

In testimony whereof I affix my signature in presence of two witnesses.

WALTER T. YOUNG.

Witnesses:
W. S. Doane,
H. A. Floyd.